(12) United States Patent
Walton et al.

(10) Patent No.: US 7,895,503 B2
(45) Date of Patent: Feb. 22, 2011

(54) SPHERE DETECTION AND RATE SELECTION FOR A MIMO TRANSMISSION

(75) Inventors: Jay Rodney Walton, Carlisle, MA (US); Mark S. Wallace, Bedford, MA (US); Steven J. Howard, Ashland, MA (US)

(73) Assignee: Qualcomm Incorporated, San Diego, CA (US)

( * ) Notice: Subject to any disclaimer, the term of this patent is extended or adjusted under 35 U.S.C. 154(b) by 1199 days.

(21) Appl. No.: 11/349,367

(22) Filed: Feb. 6, 2006

(65) Prior Publication Data

US 2007/0162827 A1 Jul. 12, 2007

Related U.S. Application Data

(60) Provisional application No. 60/758,344, filed on Jan. 11, 2006.

(51) Int. Cl.
H03M 13/00 (2006.01)
(52) U.S. Cl. .................. 714/774; 375/267; 455/454
(58) Field of Classification Search ................ 714/774; 375/267, 323; 455/454
See application file for complete search history.

(56) References Cited

U.S. PATENT DOCUMENTS

| 7,110,350 | B2 | 9/2006 | Li et al. | |
|---|---|---|---|---|
| 7,366,248 | B2 * | 4/2008 | Wang et al. | 375/267 |
| 7,443,928 | B2 | 10/2008 | Nefedov et al. | |
| 2003/0125040 | A1 * | 7/2003 | Walton et al. | 455/454 |
| 2005/0135498 | A1 * | 6/2005 | Yee | 375/267 |
| 2005/0175122 | A1 * | 8/2005 | Nefedov et al. | 375/323 |
| 2007/0177688 | A1 * | 8/2007 | Wu et al. | 375/267 |

FOREIGN PATENT DOCUMENTS

| EP | 1376921 | 1/2004 |
|---|---|---|
| EP | 1521414 | 4/2005 |
| EP | 1545082 | 6/2005 |
| WO | 03041300 | 5/2003 |
| WO | WO2003092213 | 11/2003 |
| WO | WO2005076491 | 8/2005 |
| WO | WO2005109679 | 11/2005 |

OTHER PUBLICATIONS

European Search Report—EP08015302—The Hague-Nov. 20, 2008.
European Search Opinion —EP08015302—The Hague-Nov. 20, 2008.

(Continued)

*Primary Examiner*—Sam Rizk
(74) *Attorney, Agent, or Firm*—Qualcomm Patent Group; Dmitry R. Milikovsky; James Hunt Yancey, Jr.

(57) ABSTRACT

Techniques for performing sphere detection to recover data symbols sent in a MIMO transmission are described. In an aspect, sphere detection is performed for data symbols generated with at least two modulation schemes. In another aspect, sphere detection is performed for the data symbols in an order determined based on at least one attribute of the data symbols, which may be error probabilities, modulation schemes, and/or link margins for the data symbols. In yet another aspect, rates for multiple data streams detected with sphere detection are selected based on channel state information. Signal qualities of the data streams may be estimated based on the channel state information, e.g., (1) an upper triangular matrix used for sphere detection and/or (2) an assumption that interference from data streams already detected is canceled. The rates for the data streams may be selected based on the estimated signal qualities.

44 Claims, 7 Drawing Sheets

OTHER PUBLICATIONS

European Search Report—EP08015301—The Hague-Nov. 20, 2008.

European Search Opinion—EP08015301—The Hague-Nov. 20, 2008.

Bohnke, et al.: "Efficient Near Maximum-Likelihood Decoding of Multistratum Space-Time Codes," IEEE Vehicular Technology Conference, Sep. 26, 2004 pp. 3679-3683, XP010787563, ISBN: 0-7803-8521-7.

Burg, et al.: "Performance Tradeoffs in the VLSI Implementation of the Sphere Decoding Algorithm," IEE International Conference on 3G Mobile Communication Technologies, Oct. 18, 2004 pp. 93-97, XP 002353942, ISBN: 0-86341-388-9.

Garrett, et al.: "Silicon Complexity for Maximum Likelihood MIMO Detection Using Spherical Decoding," IEEE Journal of Solid-StateCircuits, vol. 39, No. 9, Sep. 2004, pp. 1544-1552, XP001224144, ISSN: 0018-9200.

Hochwald, et al.: "Achieving Near-Capacity on a Multiple-Antenna Channel," IEEE Transactions On Communications, vol. 51, No. 3, pp. 389-399, Mar. 2003.

Sadrabadi, et al.: "A New Method of Channel Feedback Quantization for High Data Rate MIMO Systems," IEEE Communications Society, Globecom 2004, Nov. 29, 2004, pp. 91-95, XP010758860, ISBN: 0-7803-8794-5.

Xu, et al.: "Joint ML Channel Estimation and Data Detection for STBC via Novel Sphere Decoding Algorithms," Vehicular Technology Conference, May 30, 2005, pp. 434-437, XP010855430, ISBN: 0-7803-8887-9.

International Search Report-PCT/US2007/060343, International Search Authority-European Patent Office-Aug. 29, 2007.

Written Opinion-PCT/US2007/060343, International Search Authority-European Patent Office-Aug. 29, 2007.

International Preliminary Report on Patentability-PCT/US2007/060343, International Preliminary Examining Authority-European Patent Office-Apr. 16, 2008.

Taiwanese Search Report - 096101107 - TIPO - Mar. 15, 2010.

* cited by examiner

SPHERE DETECTION AND RATE SELECTION FOR A MIMO TRANSMISSION

CLAIM OF PRIORITY UNDER 35 U.S.C. §119

The present application for patent claims priority to Provisional Application No. 60/758,344 entitled "SPHERE DETECTION AND RATE SELECTION FOR A MIMO TRANSMISSIO" filed Jan. 11, 2006, and assigned to the assignee hereof and hereby expressly incorporated by reference herein.

BACKGROUND

I. Field

The present disclosure relates generally to communication, and more specifically to techniques for performing detection and rate selection for a multiple-input multiple-output (MIMO) transmission.

II. Background

A MIMO transmission is a transmission sent from multiple (T) transmit antennas to multiple (R) receive antennas. A MIMO channel formed by the T transmit antennas and the R receive antennas may be decomposed into M spatial channels, where $M \leq \min\{T, R\}$. The M spatial channels may be used to transmit data in a manner to achieve higher overall throughput and/or greater reliability.

A transmitter may encode and transmit M data streams in parallel via the T transmit antennas. A receiver obtains R received symbol streams via the R receive antennas, performs detection on the received symbol streams, and decodes the detected symbol streams to recover the transmitted data streams. To achieve optimal detection performance, the receiver would need to evaluate many hypotheses for all possible sequences of bits that might have been transmitted based on all of the information available at the receiver. Such an exhaustive search is computationally intensive and is prohibitive for many applications.

There is therefore a need in the art for techniques to perform detection with reduced complexity while achieving good performance.

SUMMARY

Techniques for performing sphere detection to recover data symbols sent in a MIMO transmission are described herein. In an aspect, sphere detection is performed for data symbols generated with at least two modulation schemes. In another aspect, sphere detection is performed for the data symbols in an order determined based on at least one attribute of the data symbols, which may be error probabilities for the data symbols, modulation schemes used for the data symbols, link margins for the data symbols, and so on. In yet another aspect, rates for data streams detected with sphere detection are selected based on channel state information. The channel state information may comprise channel estimates, noise estimates, interference estimates, power measurements, signal quality estimates, and so on. In one or more embodiments, signal qualities of the data streams may be estimated based on (1) an upper triangular matrix used for sphere detection and/or (2) an assumption that interference from data streams already detected is canceled. The rates for the data streams may then be selected based on the estimated signal qualities. In other embodiments, the rates may be selected based on the channel state information in other manners.

Sphere detection and rate selection are described in detail below. Various aspects and embodiments of the invention are also described below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The detection and rate selection techniques described herein may be used for various communication systems in which multiple data streams are transmitted in parallel via a communication channel. For example, these techniques may be used for a MIMO system with a single subcarrier, a MIMO system with multiple subcarriers, a Code Division Multiple Access (CDMA) system, a Frequency Division Multiple Access (FDMA) system, a Time Division Multiple Access (TDMA) system, and so on. Multiple subcarriers may be obtained with orthogonal frequency division multiplexing (OFDM), single-carrier frequency division multiple access (SC-FDMA), or some other modulation technique. OFDM and SC-FDMA partition the overall system bandwidth into multiple orthogonal subcarriers, which are also called tones, bins, and so on, each of which may be independently modulated with data. In general, modulation symbols are sent in the frequency domain with OFDM and in the time domain with SC-FDMA. For clarity, much of the description below is for a MIMO system with a single subcarrier.

Figure 1:
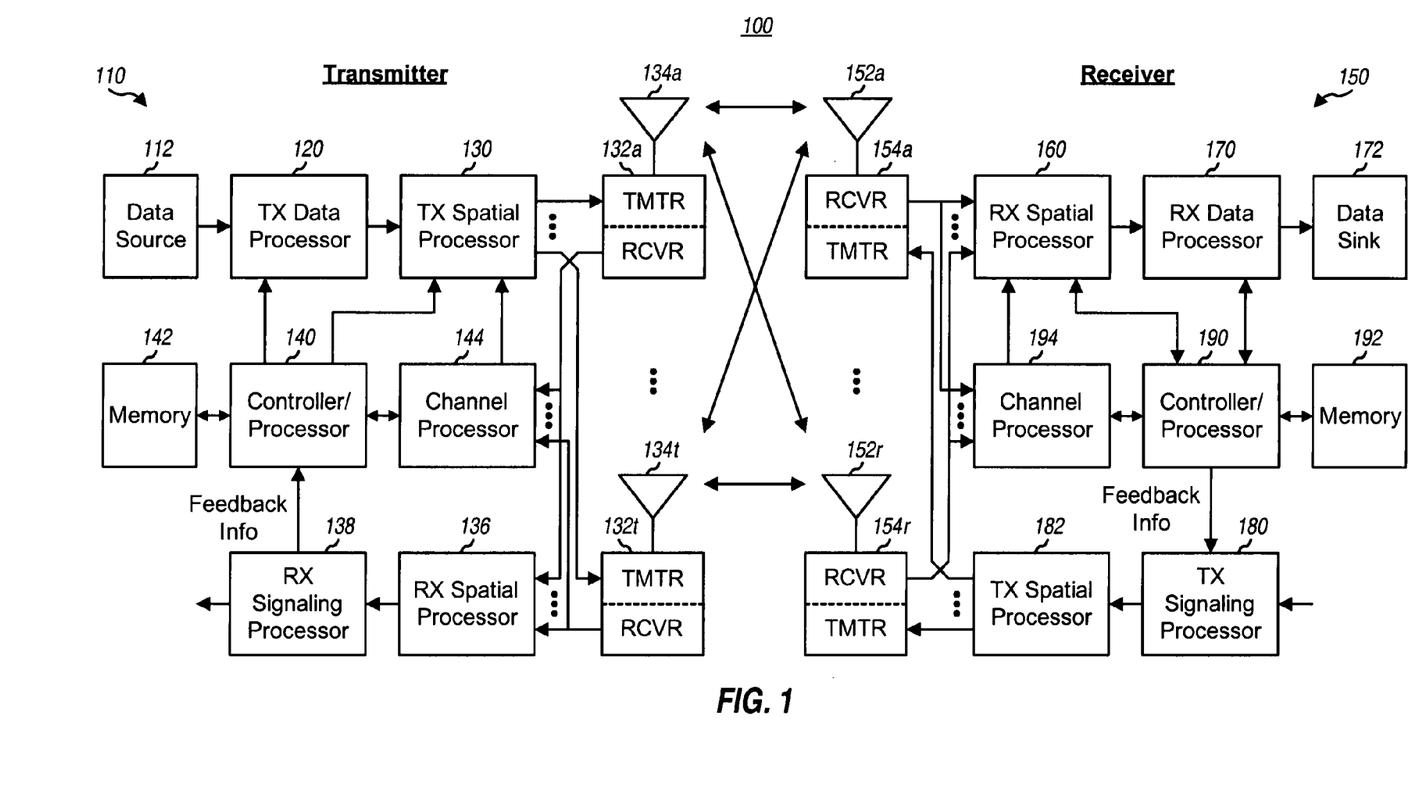
FIG. 1 shows a block diagram of aspects of a transmitter and a receiver.

FIG. 1 shows a block diagram of aspects of a transmitter 110 and a receiver 150 in a MIMO system 100. Transmitter 110 is equipped with multiple (T) antennas, and receiver 150 is equipped with multiple (R) antennas. For downlink (or forward link) transmission, transmitter 110 may be part of, and may contain some or all of the functionality of, a base station, an access point, a Node B, and so on. Receiver 150 may be part of, and may contain some or all of the functionality of, a mobile station, a user terminal, a user equipment, and so on. For uplink (or reverse link) transmission, transmitter 110 may be part of a mobile station, a user terminal, a user equipment, and so on, and receiver 150 may be part of a base station, an access point, a Node B, and so on.

At transmitter 110, a TX data processor 120 receives traffic data from a data source 112 and processes (e.g., formats, encodes, interleaves, and symbol maps) the traffic data to generate data symbols, which are modulation symbols for traffic data. A TX spatial processor 130 multiplexes the data symbols with pilot symbols, which are modulation symbols for pilot. A pilot is a transmission that is known a priori by both the transmitter and receiver and may also be referred to as a training signal, a reference, a preamble, and so on. TX spatial processor 130 performs transmitter spatial processing and provides T streams of transmit symbols to T transmitter units (TMTR) 132a through 132t. Each transmitter unit 132 processes (e.g., OFDM modulates, converts to analog, filters, amplifies, and upconverts) its transmit symbol stream and generates a modulated signal. T modulated signals from transmitter units 132a through 132t are transmitted from antennas 134a through 134t, respectively.

At receiver 150, R antennas 152a through 152r receive the T modulated signals, and each antenna 152 provides a received signal to a respective receiver unit (RCVR) 154. Each receiver unit 154 processes its received signal in a manner complementary to the processing performed by transmitter units 132 to obtain received symbols. Each receiver unit 154 provides received symbols for traffic data to an RX spatial processor 160 and provides received symbols for pilot to a channel processor 194. Channel processor 194 estimates the response of the MIMO channel from transmitter 110 to receiver 150 based on the received symbols for pilot and provides channel estimates to RX spatial processor 160. RX spatial processor 160 performs sphere detection on the received symbols with the channel estimates and provides detected symbols, which are estimates of the transmitted data symbols. An RX data processor 170 further processes (e.g., deinterleaves and decodes) the detected symbols and provides decoded data to a data sink 172.

Receiver 150 may send feedback information to assist transmitter 110 control the data transmission to receiver 150. The feedback information may indicate a particular transmission mode to use for transmission, a particular rate or packet format to use for each data stream, acknowledgments (ACKs) and/or negative acknowledgments (NAKs) for packets decoded by receiver 150, channel state information, and so on, or any combination thereof. The feedback information is processed (e.g., encoded, interleaved, and symbol mapped) by a TX signaling processor 180, multiplexed with pilot symbols and spatially processed by a TX spatial processor 182, and further processed by transmitter units 154a through 154r to generate R modulated signals, which are transmitted via antennas 152a through 152r.

At transmitter 110, the R modulated signals are received by antennas 134a through 134t, processed by receiver units 132a through 132t, spatially processed by an RX spatial processor 136, and further processed (e.g., deinterleaved and decoded) by an RX signaling processor 138 to recover the feedback information. A controller/processor 140 controls the data transmission to receiver 150 based on the received feedback information. A channel processor 144 may estimate the response of the MIMO channel from receiver 150 to transmitter 110 and may derive spatial mapping matrices used by TX spatial processor 130.

Controllers/processors 140 and 190 control the operation at transmitter 110 and receiver 150, respectively. Memories 142 and 192 store data and program codes for transmitter 110 and receiver 150, respectively.

Figure 2:
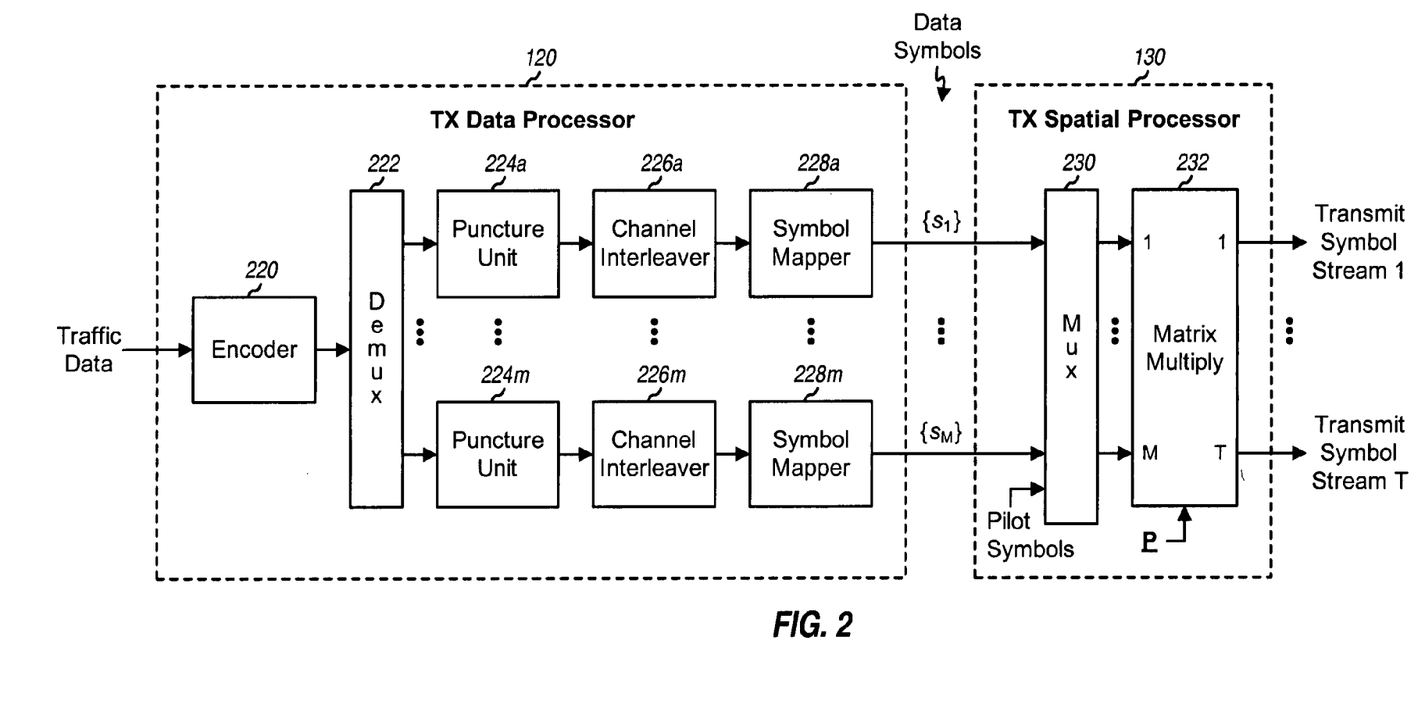
FIG. 2 shows a block diagram of aspects of a transmit (TX) data processor and a TX spatial processor at the transmitter.

FIG. 2 shows a block diagram of aspects of TX data processor 120 and TX spatial processor 130 at transmitter 110. In this embodiment, a common coding scheme is used for all data streams, and a separate code rate and a separate modulation scheme may be used for each data stream. For clarity, the following description assumes that M data streams are sent on M spatial channels. However, this need not be the case and a data stream may spread across multiple spatial channels.

Within TX data processor 120, an encoder 220 encodes traffic data in accordance with a coding scheme and generates code bits. The coding scheme may include a convolutional code, a Turbo code, a low density parity check (LDPC) code, a cyclic redundancy check (CRC) code, a block code, and so on, or a combination thereof. A demultiplexer (Demux) 222 demultiplexes or parses the code bits into M streams and provides the M code bit streams to M sets of processing units. Each set includes a puncture unit 224, a channel interleaver 226, and a symbol mapper 228. For each set, puncture unit 224 punctures or deletes code bits, as necessary, to achieve a code rate selected for its stream and provides the retained code bits to an associated channel interleaver 226. Channel interleaver 226 interleaves or reorders the code bits based on an interleaving scheme and provides interleaved bits to an associated symbol mapper 228. The interleaving may be performed separately for each data stream (as shown in FIG. 2) or across some or all data streams (not shown in FIG. 2).

In one or more embodiments, each data stream may be sent with a modulation scheme selected for that stream. In general, the same or different modulation schemes may be used for the M data streams, depending on system operation, channel conditions, and/or other factors. Each symbol mapper 228 maps its interleaved bits in accordance with the modulation scheme selected for its stream and provides a stream of data symbols $\{s_m\}$. The symbol mapping for stream m may be achieved by (1) grouping sets of $Q_m$ bits to form $Q_m$-bit values, where $Q_m \geq 1$, and (2) mapping each $Q_m$-bit value to one of $2^{Q_m}$ points in a signal constellation for the selected modulation scheme. Each mapped signal point is a complex value for a data symbol. The symbol mapping may be based on Gray mapping or non-Gray mapping. With Gray mapping, neighboring points in the signal constellation (in both the horizontal and vertical directions) differ by only one out of $Q_m$ bit positions. Gray mapping reduces the number of bit errors for more likely error events, which correspond to a detected symbol being mapped to a location near the correct location, in which case only one coded bit would be detected in error. With non-Gray mapping, neighboring points may differ by more than one bit position.

Within TX spatial processor 130, a multiplexer (Mux) 230 receives the M data symbol streams from M symbol mappers 228a through 228m and multiplexes the data symbols with pilot symbols. A matrix multiplier 232 multiplies the data and/or pilot symbols with spatial mapping matrices P and provides transmit symbols. In one or more embodiments, the spatial mapping matrices are an identity matrix I, which results in no spatial processing at the transmitter. In other embodiments, different spatial mapping matrices are used for different symbol periods and/or different subcarriers to achieve similar performance for the M data streams. In yet other embodiments, the spatial mapping matrices are matrices of eigenvectors.

FIG. 2 show aspects of a common coding scheme and separate code rates and modulation schemes may be used for the M data streams. Different code rates may be achieved for the M data streams by using different puncture patterns for these streams. In other embodiments, a common coding scheme and a common code rate are used for all data streams, and separate modulation schemes may be used for the data streams. In yet other embodiments, a common coding scheme, a common code rate, and a common modulation scheme are used for all data streams. In yet other embodiments, each data stream is independently processed based on a coding and modulation scheme selected for that data stream. In general, the same or different coding schemes, the same or different code rates, and the same or different modulation schemes may be used for the M data streams. If multiple subcarriers are available, then the same or different coding schemes, the same or different code rates, and the same or different modulation schemes may be used across the subcarriers.

Transmitter 110 typically encodes each data packet separately. A packet may be partitioned into multiple blocks, with each block containing K code bits. The K code bits in each block may be mapped to M data symbols, as follows:

$$\underline{s} = \mathrm{map}(\underline{b}), \quad \text{Eq (1)}$$

where $$\underline{s} = [s_1 \ s_2 \ \ldots \ s_M]^T \text{ is a vector with } M \text{ data symbols;}$$

$$\underline{b} = [\underline{b}_1 \ \underline{b}_2 \ \ldots \ \underline{b}_M]$$
$$= \left[ \underbrace{b_{1,1} \ldots b_{1,Q_1}}_{\underline{b}_1} \ \underbrace{b_{2,1} \ldots b_{2,Q_2}}_{\underline{b}_2} \ \ldots \ \underbrace{b_{M,1} \ldots b_{M,Q_M}}_{\underline{b}_M} \right]^T$$
$$= [b_1 \ b_2 \ \ldots \ b_k]^T$$

is a vector with K code bits in one block;
$\underline{b}_m$ is a vector with $Q_m$ code bits used to form data symbol $s_m$;
$b_{m,q}$, for $m=1, \ldots, M$ and $q=1, \ldots, Q_m$, is the q-th code bit in vector $\underline{b}_m$;
$b_k$, for $k=1, \ldots, K$, is the k-th code bit in vector b; and
"T" denotes a transpose.

Equation (1) indicates that there is a one-to-one mapping between a given bit vector b and a corresponding data vector s. In general, the same or different modulation schemes may be used for the M data symbols sent on a given data vector s. Hence, $Q_1$ through $Q_M$ may be the same or different for the M data symbols in vector s.

In one or more embodiments, the M data streams are jointly encoded so that a single packet may be sent on multiple (e.g., all M) spatial channels. In other embodiments, the M data streams are independently encoded so that each packet is sent on one spatial channel. In yet other embodiments, some data streams are jointly encoded while other data streams are independently encoded.

For clarity, the following description assumes that one data stream is sent on each spatial channel. The terms "data stream" and "spatial channel" are thus interchangeable for much of the description below. The number of data streams may be configurable and may be selected based on channel conditions and/or other factors. For clarity, the following description assumes that M data streams are sent on M spatial channels.

1. Detection

The received symbols at the receiver may be expressed as:

$$y = H_{ch} \cdot P \cdot s + n = H \cdot s + n, \quad \text{Eq (2)}$$

where P is a T×M spatial mapping matrix used by the transmitter;

$H_{ch}$ is an R×T actual MIMO channel response matrix;
$H = H_{ch} \cdot P$ is an R×M effective MIMO channel response matrix;
y is an R×1 vector with R received symbols at the receiver; and
n is an R×1 vector of noise.

The noise may be assumed to be additive white Gaussian noise (AWGN) with a zero mean vector and a covariance matrix of $\sigma_n^2 \cdot I$, where $\sigma_n^2$ is the variance of the noise.

The effective MIMO channel response H includes the actual MIMO channel response $H_{ch}$ and the spatial mapping matrix P used by the transmitter. The effective MIMO channel response matrix may be given as:

$$\underline{H} = \begin{bmatrix} h_{1,1} & \ldots & h_{1,M} \\ \vdots & \ddots & \vdots \\ h_{R,1} & \ldots & h_{R,M} \end{bmatrix}, \quad \text{Eq (3)}$$

where entry $h_{r,m}$, for $r=1, \ldots, R$ and $m=1, \ldots, M$, denotes the complex channel gain observed by data stream m at receive antenna r. For simplicity, the MIMO channel is assumed to be flat fading with no frequency selectivity. The receiver typically derives $\hat{H}$, which is an estimate of H, and uses $\hat{H}$ for detection. For simplicity, the description herein assumes no channel estimation error, so that $\hat{H}=H$. H is also referred to as a MIMO channel response matrix.

For a MIMO transmission on a single subcarrier, the receiver obtains a received symbol vector y in each symbol period used for transmission. For a MIMO transmission on multiple subcarriers, the receiver obtains a received symbol vector y for each subcarrier in each symbol period used for transmission. In one or more embodiments, the receiver performs detection separately for each received symbol vector y. In other embodiments, the receiver performs detection jointly for multiple received symbol vectors. The receiver may perform detection in various manners.

The receiver may perform maximum likelihood (ML) detection on the received symbols to obtain the detected symbols. For ML detection, the receiver evaluates each of $2^K$ hypothesized symbol vectors that might have been transmitted for data symbol vector s. For each hypothesized symbol vector, the receiver computes a distance metric that may be given as:

$$D(\tilde{s}) = \|y - H \cdot \tilde{s}\|^2 \quad \text{Eq (4)}$$

where $\tilde{s}$ is a symbol vector hypothesized to have been transmitted for vector s; and $D(\tilde{s})$ is the distance for hypothesized symbol vector $\tilde{s}$.

Equation (4) may also be referred to as a cost function, an error function, and so on. $D(\tilde{s})$ may also be referred to as a cost value or an error value for vector $\tilde{s}$.

For ML detection, the receiver obtains $2^K$ distances for the $2^K$ hypothesized symbol vectors $\tilde{s}$. The receiver may then derive the detected symbols as follows:

$$\hat{s} = \arg\left\{\min_{\tilde{s}} \|\underline{y} - \underline{H} \cdot \tilde{s}\|^2\right\}, \quad \text{Eq (5)}$$

where $\hat{s} = [\hat{s}_1 \hat{s}_2 \ldots \hat{s}_M]^T$ is an M×1 vector with M detected symbols. In equation (5), the minimum distance among the $2^K$ distances for the $2^K$ hypothesized symbol vectors is identified. The hypothesized symbol vector with the minimum distance is provided as the detected symbol vector ŝ, which is an estimate of the transmitted data symbol vector s.

For ML detection, an exhaustive search is performed over all possible combinations of data symbols that might have been transmitted for data symbol vector s. The exhaustive search considers all $2^K$ possible hypotheses for the data symbol vector s. Hence, the complexity of ML detection is exponential in the number of bits (K) used to form the data symbol vector s. ML detection can provide good performance. However, the exhaustive search is computationally intensive and may be prohibitive for many applications. For example, if four data streams are sent using QPSK for all streams, then K=8 and 256 hypotheses are evaluated for each received symbol vector y. However, if 16-QAM is used for the four streams, then K=16 and 65,536 hypotheses are evaluated for each received symbol vector y, which is much more complex. If the four data streams are sent using QPSK, 16-QAM, 64-QAM, and 256-QAM, then K=20 and over one million hypotheses are evaluated for each received symbol vector y, which may be impractical. This example illustrates the rapid growth in the number of hypotheses for larger signal constellation sizes.

The number of hypotheses to consider may be reduced by performing sphere detection (SD), which is also referred to as list sphere detection, sphere decoding, spherical decoding, and so on. Sphere detection seeks to reduce the search space of ML detection by performing a search for candidate hypotheses and discarding less likely hypotheses.

For sphere detection, the distance metric in equation (4) may be simplified by performing QR decomposition of the MIMO channel response matrix H, as follows:

$$H = Q \cdot R, \qquad \text{Eq (6)}$$

where Q is an R×M orthonormal matrix and R is a M×M upper triangular matrix. The orthonormal matrix Q has orthogonal columns and unit power for each column, or $Q^H \cdot Q = I$, where "$H$" denotes a conjugate transpose. The upper triangular matrix R contains zeros below the diagonal. The structure of the upper triangular matrix R may be exploited to reduce the number of hypotheses to evaluate.

Equation (2) may be rewritten as follows:

$$y = H \cdot s + n = Q \cdot R \cdot s + n, \qquad \text{and Eq (7)}$$

$$y' = Q^H \cdot y = R \cdot s + n', \qquad \text{Eq (8)}$$

where $y' = [y_1' \, y_2' \ldots y_R']^T$ is a rotated version of y and $n' = Q^H \cdot n$.

The distance metric in equation (4) may be rewritten as follows:

$$D(\tilde{s}) = \|y' - R \cdot \tilde{s}\|^2 \qquad \text{Eq (9)}$$

Equation (9) may be expanded as:

$$D(\tilde{s}) = \left\| \begin{bmatrix} y_1' \\ y_2' \\ \vdots \\ y_M' \end{bmatrix} - \begin{bmatrix} r_{1,1} & r_{1,2} & \cdots & r_{1,M} \\ 0 & r_{2,2} & \cdots & r_{2,M} \\ \vdots & \vdots & \ddots & \vdots \\ 0 & 0 & \cdots & r_{M,M} \end{bmatrix} \cdot \begin{bmatrix} \tilde{s}_1 \\ \tilde{s}_2 \\ \vdots \\ \tilde{s}_M \end{bmatrix} \right\|^2 . \qquad \text{Eq (10)}$$

For M=4, equation (10) may be further expanded as follows:

$$D_4 = |y_4' - r_{4,4} \cdot \tilde{s}_4|^2, \qquad \text{Eq (11a)}$$

$$D_3 = D_4 + |y_3' - r_{3,4} \cdot \tilde{s}_4 - r_{3,3} \cdot \tilde{s}_3|^2, \qquad \text{Eq (11b)}$$

$$D_2 = D_3 + |y_2' - r_{2,3} \cdot \tilde{s}_3 - r_{2,4} \cdot \tilde{s}_4 - r_{2,2} \cdot \tilde{s}_2|^2, \qquad \text{and Eq (11c)}$$

$$D_1 = D_2 + |y_1' - r_{1,2} \cdot \tilde{s}_2 - r_{1,3} \cdot \tilde{s}_3 - r \cdot \tilde{s}_4 - r_{1,1} \cdot \tilde{s}_1|^2 = D(\tilde{s}). \qquad \text{Eq (11d)}$$

Equation set (11) may be generalized for any value of M, as follows:

$$D_i = D_{i+1} + \left| y_i' - \sum_{j=i}^{M} r_{i,j} \cdot \tilde{s}_j \right|^2, \quad \text{for } i = M, \ldots, 1, \qquad \text{Eq (12)}$$

where $D_{M+1} = 0$ For equation (12), index i runs backward from M down to 1.

As shown in equations (10) through (12), the distance metric may be computed incrementally with M terms $D_1$ through $D_M$. Term $D_M$ is only dependent on hypothesized symbol $\tilde{s}_M$ and represents the distance for this symbol. Term $D_{M-1}$ is dependent on hypothesized symbols $\tilde{s}_{M-1}$ and $\tilde{s}_M$ and represents the aggregate distance for these two symbols. Each subsequent term is dependent on one additional hypothesized symbol. Term $D_1$ is dependent on all M hypothesized symbols $\tilde{s}_1$ through $\tilde{s}_M$ and represents the total distance for all these symbols. The distance metric may be computed incrementally in M levels, one term $D_i$ in each level, starting with the last term $D_M$ in the first level. For each level, $D_i$ is computed for all hypotheses applicable for that level.

Sphere detection may be performed in various manners. Several embodiments of sphere detection are described below.

For full sphere detection, all hypotheses with distances equal to or less than a threshold $D_{th}$ are retained, and all other hypotheses are discarded. The threshold $D_{th}$ is also called a sphere radius. Full sphere detection may be performed as follows. For the first level with i=M, a list $P_M$ is formed with $2^{Q_M}$ hypothesized symbols $\tilde{s}_M$ that might have been transmitted for data symbol $s_M$, which is generated based on a signal constellation having $2^{Q_M}$ signal points, e.g., $2^{Q_M}$ QAM. $D_M$ is computed for the $2^{Q_M}$ hypothesized symbols in list $P_M$ as shown in equation (12) to obtain $2^{Q_M}$ distances. All hypothesized symbols with distances less than or equal to the threshold are stored in a candidate list $C_M$. All other hypothesized symbols are discarded, which has the effect of pruning all hypothesized symbol vectors $\tilde{s}$ containing the discarded symbols.

For the second level with i=M−1, a list $P_{M-1}$ is formed with $2^{Q_{M-1}}$ hypothesized symbols $\tilde{s}_{M-1}$ that might have been transmitted for data symbol $s_{M-1}$, which is generated based on a signal constellation having $2^{Q_{M-1}}$ signal points. $D_{M-1}$ is computed for all valid hypothesized symbol pairs $(\tilde{s}_{M-1}, \tilde{s}_M)$ to obtain the distances for these hypothesized symbol pairs. The valid hypothesized symbol pairs include all possible combinations of each symbol in candidate list $C_M$ with each symbol in list $P_{M-1}$. All hypothesized symbol pairs with distances smaller than or equal to the threshold are stored in a candidate list $C_{M-1}$, and all other hypothesized symbol pairs are discarded.

Each of the remaining levels may be evaluated in similar manner. A list $P_i$ is formed with $2^{Q_i}$ hypothesized symbols $\tilde{s}_i$ that might have been transmitted for data symbol $s_i$, which is generated based on a signal constellation having $2^{Q_i}$ signal points. $D_i$ is computed for all valid hypothesized symbol sets $(\tilde{s}_i, \ldots, \tilde{s}_M)$ to obtain distances for these hypothesized symbol sets. The valid hypothesized symbol sets include all possible combinations of each hypothesis in candidate list $C_{i+1}$ with each symbol in list $P_i$. All hypothesized symbol sets with distances smaller than or equal to the threshold are stored in a candidate list $C_i$, and all other hypothesized symbol sets are discarded. After all M levels have been evaluated, the detected symbols may be determined based on the hypotheses stored in candidate list $C_1$. For clarity, the description above uses different candidate lists for different levels. A single candidate list C may also be used for all M levels and may be updated at each level.

Figure 3:
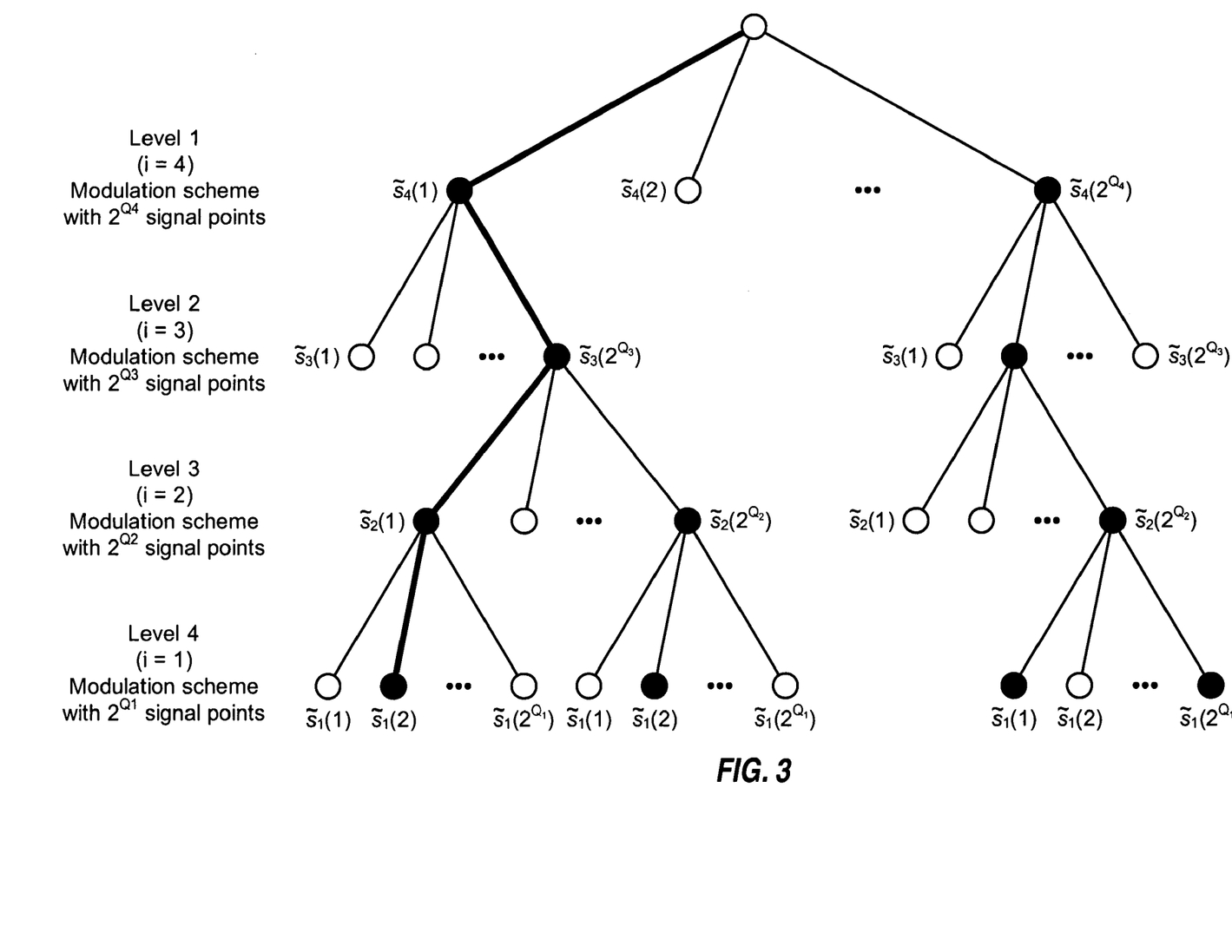
FIG. 3 shows aspects of an exemplary search tree for sphere detection.

FIG. 3 shows an exemplary search tree for sphere detection of data symbols that may be generated with different modulation schemes. In this example, M=4 and four terms $D_1$ through $D_4$ are computed. For the first level with i=4, $D_4$ is computed for $2^{Q_4}$ hypotheses for $2^{Q_4}$ possible data symbols that might have been transmitted for data symbol $s_4$. The $2^{Q_4}$ hypothesized symbols are denoted as $\tilde{s}_4(1)$ through $\tilde{s}_4(2^{Q_4})$ in FIG. 3. Two hypotheses have distances less than or equal to the threshold and are shown with black filled nodes. For the second level with i=3, $D_3$ is computed for $2 \cdot 2^{Q_3}$ hypotheses for $2 \cdot 2^{Q_3}$ possible symbol pairs that might have been transmitted for data symbols $s_3$ and $s_4$. Again, two hypotheses have distances less than or equal to the threshold and are shown with black filled nodes. For the third level with i=2, $D_2$ is computed for $2 \cdot 2^{Q_2}$ hypotheses for $2 \cdot 2^{Q_2}$ possible symbol sets that might have been transmitted for data symbols $s_2$, $s_3$ and $s_4$. Three hypotheses have distances less than or equal to the threshold and are shown with black filled nodes. For the last level with i=1, $D_1$ is computed for $3 \cdot 2^{Q_1}$ hypotheses for $3 \cdot 2^{Q_1}$ possible symbol sets that might have been transmitted for data symbols $s_1$, $s_2$, $s_3$ and $s_4$. Four hypotheses have distances less than or equal to the threshold and are shown with black filled nodes. The set of symbols with the smallest distance is shown by the heavy line.

For partial sphere detection, $N_{bs}$ best hypothesized symbols are retained for each level and used to form hypotheses for the next level. As shown in equation set (11), the QR decomposition allows data symbol $s_4$ to be detected in isolation by removing the interference from other data symbols. The detection of the next data symbol $s_3$ relies on the removal of the interference from data symbol $s_4$. This interference is given as $r_{3,4} \cdot \tilde{s}_4$ in equation (11b). The accuracy of the interference estimate and the effectiveness of the interference cancellation are both dependent on symbol $\tilde{s}_4$ being correct. If $\tilde{s}_4 = \hat{s}_4$ and there are no errors in the channel estimates, then the interference from data symbol $s_4$ may be completely canceled from the detection of data symbol $s_3$.

In one or more embodiments, the number of best hypothesized symbols ($N_{bs}$) to retain for each level is a fixed value, e.g., 2, 3, 4, and so on. In other embodiments, $N_{bs}$ is a configurable value that may be dependent on the constellation size for the data symbol $s_i$ being detected, the signal quality or other channel state information for data symbol $s_i$, and/or some other criteria. Signal quality may be quantified by signal-to-noise ratio (SNR), signal-to-noise-and-interference ratio (SINR), energy-per-symbol-to-total-noise ratio ($E_s/N_0$), and so on. For example, $N_{bs}$ may be set to a quarter of the signal constellation size, $N_{bs} = 2^{Q_i}/4$, or some other percentage. $N_{bs}$ may be selected such that the probability of the transmitted data symbol being among the $N_{bs}$ best hypothesized symbols meets or exceeds some predetermined percentage, e.g., 95% or some other percentage.

For constrained sphere detection, one best hypothesized symbol is retained for each level and is referred to as a hard decision for that level. Constrained sphere detection is a special case of partial sphere detection with $N_{bs}=1$. The hard decision for each level may be given as:

$$\bar{s}_i = \arg\{\min_{\tilde{s}_i} D_i\}, \qquad \text{Eq (13)}$$

where $\bar{s}_i$ is a hard decision for transmitted data symbol $s_i$. In equation (13), the hypothesized symbol $\tilde{s}_i$ that produces the minimum distance for $D_i$ is provided as the hard decision for data symbol $s_i$. The hard decision for each level may be carried forward to the next level and used to compute the distances for the next level.

The distance metric in equation (12) may then be expressed as:

$$D_i = D_{i+1} + \left| y_i' - r_{i,i} \cdot \tilde{s}_i - \sum_{j=i+1}^{M} r_{i,j} \cdot \bar{s}_j \right|^2, \qquad \text{Eq (14)}$$

for $i = M, \ldots, 1$.

The summation term in equation (14) may be considered as the interference from prior detected symbols. In this case, a modified received symbol $y_i''$ obtained after interference cancellation may be expressed as:

$$y_i'' = y_i' - \sum_{j=i+1}^{M} r_{i,j} \cdot \bar{s}_j, \qquad \text{Eq (15)}$$

for $i = M-1, \ldots, 1$.

The distance metric in equation (14) may then be rewritten as:

$$D_i = D_{i+1} + |y_i'' - r_{i,i} \cdot \tilde{s}_i|^2, \text{ for } i=M-1, \ldots, 1. \qquad \text{Eq (16)}$$

As an example, if two data streams are sent and $s=[s_1 s_2]^T$ and $y'=[y_1' y_2']^T$, then the distance for data symbol $s_2$ may be expressed as:

$$D_2 = |y_2' - r_{2,2} \cdot \tilde{s}_2|^2. \qquad \text{Eq (17)}$$

The distance for data symbol $s_1$ may then be expressed as:

$$D_1 = D_2 + |y_1' - r_{1,2} \cdot \bar{s}_2 - r_{1,1} \cdot \tilde{s}_1|^2 = D_2 + |y_1'' - r_{1,1} \cdot \tilde{s}_1|^2, \qquad \text{Eq (18)}$$

where $y_1'' = y_1' - r_{1,2} \cdot \bar{s}_2$.

For partial and constrained sphere detection, the number of hypotheses to evaluate at each level after the first level may be substantially reduced by retaining $N_{bs}$ best hypothesized symbols for each level. For constrained sphere detection, one hard decision is carried forward for each level, and the number of hypotheses to evaluate at each level is $2^{Q_i}$. For the second level, different hypothesized symbols $\tilde{s}_{M-1}$ and hard decision $\bar{s}_M$ may be evaluated, instead of different hypothesized symbol pairs ($\tilde{s}_{M-1}, \tilde{s}_M$). For the third level, different hypothesized symbols $\tilde{s}_{M-2}$ and hard decisions $\bar{s}_M$ and $\bar{s}_{M-1}$ may be evaluated, instead of different hypothesized symbol sets ($\tilde{s}_{M-2}, \tilde{s}_{M-1}, \tilde{s}_M$).

The constrained sphere detection scheme relies on distances computed using hard decisions for data symbols already detected, as shown in equation (14). The performance of constrained sphere detection is then dependent on the reliability of the hard decisions. The reliability of the hard decisions for a given data stream is dependent on the modulation scheme and the signal quality of that stream. In one or more embodiments, the order of detection is selected based on expected symbol probabilities or symbol error rates (SERs) for the data streams. The SER for each data stream may be estimated or ascertained based on channel state information. In this embodiment, detection is first performed for the data stream with the lowest SER. This data stream should have the largest link margin relative to the un-coded signal quality, e.g., SNR, requirement for the modulation scheme used for that data stream. Detection is then performed for the data stream with the next lowest SER, and so on. This detection ordering reduces propagation of symbol errors from earlier detected streams in the computation of distances for the later detected streams. The rate for each data stream may be selected to achieve a desired SER.

A rate or packet format may be selected for each data stream based on its signal quality, as described below. The rate may be associated with a particular spectral efficiency, which may be given in units of bits per second per Hertz (bps/Hz). A given rate may be achieved with different combinations of modulation scheme and code rate. For example, a rate of 3 bps/Hz may be achieved with (1) code rate ¾ and 16-QAM, (2) code rate ½ and 64-QAM, or (3) code rate ⅜ and 256-QAM. These different combinations of code rate and modulation scheme may require slightly different signal qualities to achieve a target packet error rate (PER). However, these different combinations of code rate and modulation scheme may have substantially different SERs. For a given signal quality, the SER for 16-QAM is lower than the SER for 64-QAM, which is lower than the SER for 256-QAM. The progressively higher SERs for 16-QAM, 64-QAM and 256-QAM are accounted for by the progressively stronger codes (or lower code rates) for 16-QAM, 64-QAM and 256-QAM.

The performance of constrained sphere detection is affected by the SERs for the earlier data streams (e.g., the first data stream) to be detected. The rate for each of the earlier detected streams may be selected to achieve a target SER or lower. This target SER may be 5%, 10%, or some other value. In one or more embodiments, if the SER for an earlier (e.g., first) detected stream exceeds the target SER, then the rate for the stream is reduced to a highest rate with a lower order modulation scheme, which then reduces error propagation for the interference cancellation. The selection of a lower order modulation scheme may reduce the throughput of the earlier detected stream but may improve the throughputs of later detected streams. Computer simulation indicates that this rate selection strategy may improve the overall throughput for certain channel conditions, e.g., high SNRs.

For the sphere detection schemes described above, the number of candidate hypotheses to store in list C may be trimmed in various manners. In one or more embodiments, all hypotheses with distances equal to or less than the threshold $D_{th}$ are retained. For this embodiment, the number of candidate hypotheses to store at each level is not necessarily constant. In other embodiments, the number of candidate hypotheses to retain at each level may be a function of the expected SER, which is dependent on the modulation scheme and the signal quality of the data stream being detected. In yet other embodiments, $N_{b1}$ best hypotheses are retained at each level. In yet other embodiments, up to $N_{b1}$ best hypotheses with distances equal to or less than the threshold $D_{th}$ are retained at each level. In yet other embodiments, $N_{bn}$ best hypotheses are retained for each node. In yet other embodiments, up to $N_{bn}$ best hypotheses with distances equal to or less than the threshold $D_{th}$ are retained for each node. $N_{b1}$ and $N_{bn}$ may be selected based on a tradeoff between detection performance, complexity, and/or other considerations. For example, $N_{b1}$ and $N_{bn}$ may be selected based on signal constellation size so that more candidate hypotheses are stored for larger signal constellations. $N_{b1}$ and $N_{bn}$ may also be constrained to be equal to or larger than some minimum value (e.g., $N_{min}=2$), which ensures that at least $N_{min}$ candidate hypotheses are stored for each level or node. In general, any number of hypotheses may be stored in the candidate list C.

After completing sphere detection, log likelihood ratios (LLRs) may be computed for the code bits based on the candidate hypotheses in list C, as follows:

$$L_e(b_k) \approx \frac{1}{2} \max_{\tilde{b}: C_k^+} \left\{ -\frac{1}{\sigma_n^2} \cdot \|\underline{y} - \underline{H} \cdot \tilde{\underline{s}}\|^2 + \tilde{\underline{b}}_{[k]}^T \cdot \underline{L}_{a,[k]} \right\} - \frac{1}{2} \max_{\tilde{b}: C_k^-} \left\{ -\frac{1}{\sigma_n^2} \cdot \|\underline{y} - \underline{H} \cdot \tilde{\underline{s}}\|^2 + \tilde{\underline{b}}_{[k]}^T \cdot \underline{L}_{a,[k]} \right\}. \quad \text{Eq (19)}$$

where
  $\tilde{b}$ is a bit vector corresponding to hypothesized symbol vector $\tilde{s}$;
  $\tilde{b}_{[k]}$ is a vector with all code bits in vector $\tilde{b}$ except for code bit $b_k$;
  $L_{a,[k]}$ is a vector with a priori LLRs for all code bits in $\tilde{b}_{[k]}$;
  $C_k^+$ is a subset of candidate list C and contains hypotheses for which $b_k=+1$;
  $C_k^-$ is a subset of candidate list C and contains hypotheses for which $b_k=-1$; and
  $L_e(b_k)$ is the extrinsic LLR for code bit $b_k$.

In general, the detected symbols may be provided as LLRs or in some other form.

Equation (18) may be evaluated for each code bit in the transmitted bit vector b. For each code bit $b_k$, all hypothesized symbol vectors $\tilde{s}$ in candidate list C may be considered. Each hypothesized symbol vector $\tilde{s}$ has a corresponding hypothesized bit vector $\tilde{b}$. For equation (18), the expression within the max operation is computed for each hypothesized bit vector $\tilde{b}$ to obtain a result for that bit vector. The largest result for all hypothesized bit vectors $\tilde{b}$ with $b_k=+1$ is identified. The largest result for all hypothesized bit vectors $\tilde{b}$ with $b_k=-1$ is also identified. The LLR for code bit $b_k$ is equal to the difference between the largest result for $b_k=+1$ and the largest result for $b_k=-1$.

Figure 4:
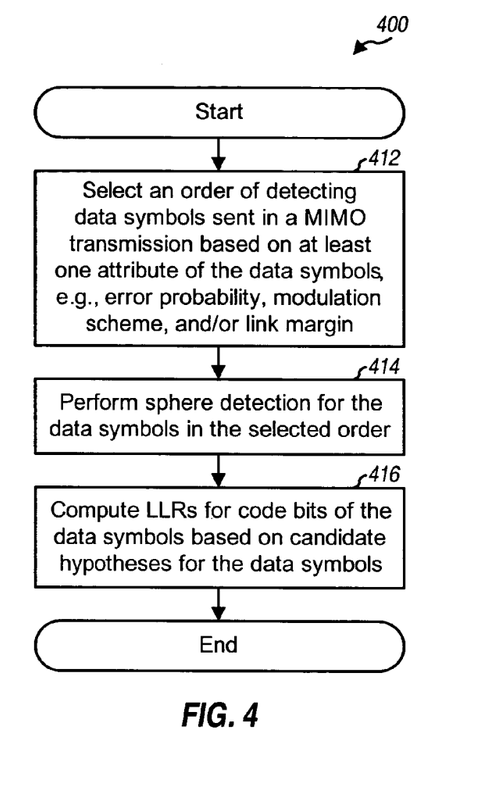
FIG. 4 shows aspects of a process for performing sphere detection in a selected order.

FIG. 4 shows aspects of a process 400 for performing sphere detection. An order of detecting data symbols sent in a MIMO transmission is selected based on at least one attribute of the data symbols (block 412). In one or more embodiments, the order is selected based on error probabilities for the data symbols, starting with the data symbol having the lowest error probability. In other embodiments, the order is selected based on modulation schemes for the data symbols, starting with the data symbol having the lowest order modulation scheme. In yet other embodiments, the order is selected based on link margins for the data symbols, starting with the data symbol having the largest link margin.

Sphere detection is performed for the data symbols in the selected order (block 414). For sphere detection, a channel response matrix may be decomposed to obtain an upper triangular matrix. The data symbols may be detected one at a time in the selected order. For each data symbol, distances for multiple hypotheses of the data symbol may be computed based on the received symbols, the upper triangular matrix, and candidate hypotheses and/or hard decisions for data symbols already detected. Candidate hypotheses for the data symbols are determined based on the computed distances. LLRs for code bits of the data symbols are computed based on the candidate hypotheses (block 416).

Figure 5:
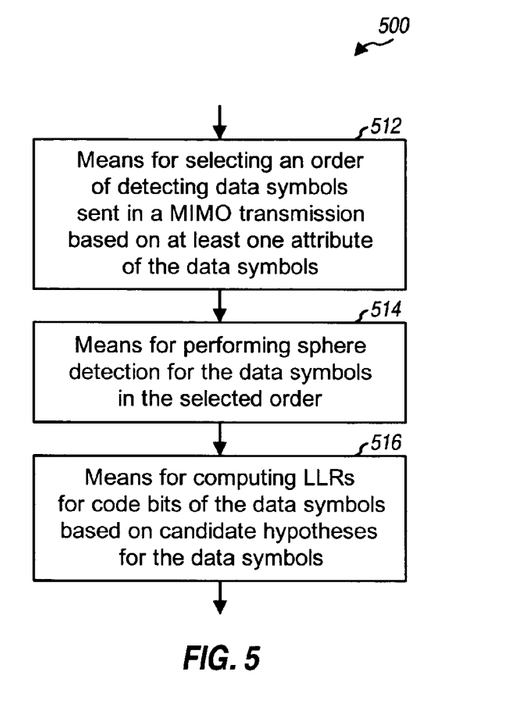
FIG. 5 shows aspects of an apparatus for performing sphere detection in a selected order.

FIG. 5 shows aspects of an apparatus 500 for performing sphere detection. Apparatus 500 includes means for selecting an order of detecting data symbols sent in a MIMO transmission based on at least one attribute of the data symbols, e.g., error probabilities, modulation schemes, and/or link margins (block 512), means for performing sphere detection for the data symbols in the selected order (block 514), and means for computing LLRs for code bits of the data symbols based on the candidate hypotheses from the sphere detection (block 516).

Figure 6:
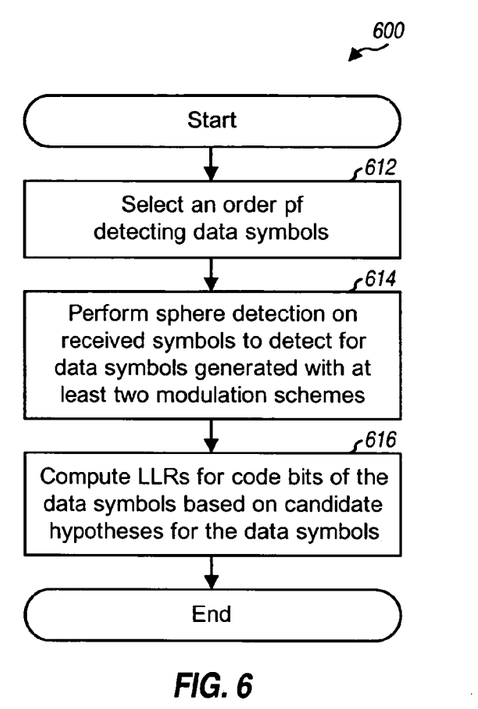
FIG. 6 shows aspects of a process for performing sphere detection for data symbols generated with multiple modulation schemes.

FIG. 6 shows aspects of a process 600 for performing sphere detection. An order of detecting data symbols sent in a MIMO transmission is selected, e.g., based on error probabilities, modulation schemes, link margins, and so on (block 612). Sphere detection is then performed on received symbols to detect for data symbols generated with at least two modulation schemes (block 614). The sphere detection may be performed based on the modulation schemes used for the data symbols. In one or more embodiments, the number of hypotheses to evaluate for each data symbol is determined based on the modulation scheme for the data symbol. In other embodiments, the number of hypotheses to retain for each data symbol is determined based on the modulation scheme for the data symbol. LLRs for code bits of the data symbols are computed based on candidate hypotheses for the data symbols (block 616).

Figure 7:
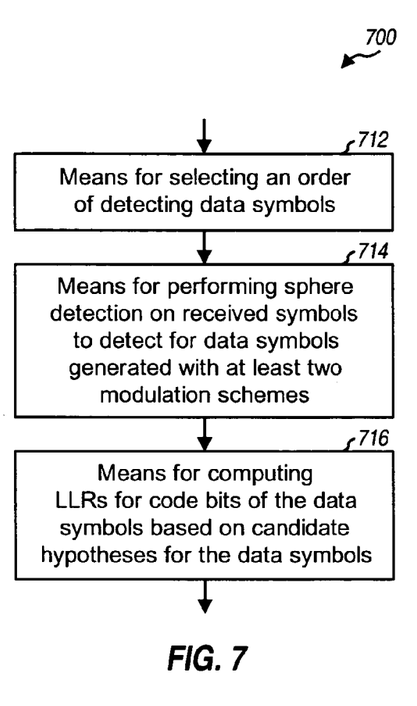
FIG. 7 shows aspects of an apparatus for performing sphere detection for data symbols generated with multiple modulation schemes.

FIG. 7 shows aspects of an apparatus 700 for performing sphere detection. Apparatus 700 includes means for selecting an order of detecting data symbols sent in a MIMO transmission (block 712), means for performing sphere detection on received symbols to detect for data symbols generated with at least two modulation schemes (block 714), and means for computing LLRs for code bits of the data symbols based on candidate hypotheses for the data symbols (block 716).

2. Rate Selection

A rate or packet format may be selected for each data stream to achieve a target level of performance, which may be quantified by a target PER, e.g., 1% PER. The rate for each data stream may be selected based on channel state information, e.g., the signal quality of the data stream, which may be estimated as described below.

For sphere detection with QR decomposition, the signal quality, e.g., SNR, of each data stream may be dependent on the order in which the stream is detected. For the simple case with two data streams, with stream 2 detected first followed by stream 1, the SNR of each data stream may be expressed as:

$$\gamma_{sd,2} = \frac{r_{2,2}^2}{\sigma_n^2}, \text{ and} \qquad \text{Eq (20)}$$

$$\gamma_{sd,1} = \frac{\|h_1\|^2}{\sigma_n^2}, \qquad \text{Eq (21)}$$

where $\gamma_{sd,1}$ and $\gamma_{sd,2}$ are the SNRs of streams 1 and 2, respectively, with sphere detection.

The receiver may also implement a successive interference cancellation (SIC) scheme and may perform spatial matched filtering and successive interference cancellation using hard decisions. For the SIC scheme, the receiver recovers the M data streams in M stages, one data stream in each stage, and estimates and cancels the interference caused by each recovered data stream. For the first stage, the receiver performs spatial matched filtering on the received symbols y and obtains detected symbols for one data stream. The spatial matched filtering may be based on zero-forcing (ZF), minimum mean square error (MMSE), maximal ratio combining (MRC), or some other technique. For coded interference cancellation, the receiver processes (e.g., symbol demaps, deinterleaves, and decodes) the detected symbols to obtain decoded data and further processes (e.g., encodes, interleaves, and demodulates) the decoded data to obtain remodulated symbols, which are estimates for the data symbols just decoded. The receiver further processes the remodulated symbols with the channel estimates and obtains interference components $i_M$ due to the recovered data stream. The interference components $i_M$ are then subtracted from the received symbols y to obtain modified received symbols $y_{M-1}$ having the interference components removed. The modified received symbols $y_{M-1}$ are then processed by the next stage.

The constrained sphere detection scheme is equivalent to the SIC scheme with uncoded interference cancellation. For constrained sphere detection, hard decisions are obtained for data symbols $s_{i+1}$ through $s_M$ and used for interference cancellation. The modified received symbol $y_i''$ is based on hard decisions $\bar{s}_{i+1}$ through $\bar{s}_M$ for the data symbols already detected, as shown in equation (15). Ideally, it is desirable to perform interference cancellation using the remodulated symbols generated from the output of the decoder since these symbols tend to be more reliable than the hard decisions. However, in many cases, the remodulated symbols are not available due to processing complexity and/or latency.

A parallel may be drawn between sphere detection and the SIC scheme. The SNRs of the data streams detected with sphere detection may be estimated by the SNRs of the data streams recovered with the SIC scheme. For the SIC scheme, a spatial filter vector may be derived for data stream m based on the zero-forcing (ZF) or MMSE technique, as follows:

$$m_{zf,m}^H = h_m^H \cdot [H_m^H \cdot H_m]^{-1}, \text{ for } m=M, \ldots, 1, \qquad \text{Eq (22)}$$

$$m_{mmse,m}^H = h_m^H \cdot [H_m^H \cdot H_m + \sigma_n^2 \cdot I]^{-1}, \qquad \text{Eq (23)}$$

where $H_m$ is an R×m reduced channel response matrix for data stream m;

$h_m$ is an R×1 channel response vector for data stream m; and $m_{zf,m}$ and $m_{mmse,m}$ are R×1 spatial filter vectors for data stream m for the zero-forcing and MMSE techniques, respectively.

$H_m$ contains m columns of H for m data streams not yet detected, with M−m columns of H for the data streams already detected in prior stages removed.

The detected symbol for data stream m, $\hat{s}_m$, may be expressed as:

$$\hat{s}_m = m_m^H \cdot y_m, \qquad \text{Eq (24)}$$

where $y_m$ is an R×1 vector of modified received symbols for stage m; and $m_m$ may be equal to $m_{zf,m}$ or $m_{mmse,m}$.

The SNR of data stream m for the SIC scheme may be expressed as:

$$\gamma_{zf-sic,m} = \frac{1}{\sigma_n^2 \cdot \|m_{zf,m}\|^2}, \text{ and} \qquad \text{Eq (25)}$$

$$\gamma_{mmse-sic,m} = \frac{m_m^H \cdot h_m}{1 - m_m^H \cdot h_m}, \qquad \text{Eq (26)}$$

where $\gamma_{zf\text{-}sic,m}$ and $\gamma_{mmse\text{-}sic,m}$ are the SNRs of data stream m with the zero-forcing and MMSE techniques, respectively. The SNRs computed for the data streams based the SIC scheme with the zero-forcing or MMSE technique may be used to select the rates for the data streams detected with sphere detection.

It can be shown that for the case with two data streams and perfect interference cancellation, $\gamma_{mmse\text{-}sic,1}$ for the data stream detected second with the SIC scheme is equal to $\gamma_{sd,1}$ for the data stream detected second with sphere detection. $\gamma_{mmse\text{-}sic,2}$ for the data stream detected first with the SIC scheme is almost the same as $\gamma_{sd,2}$ for the data stream detected first with sphere detection at high SNRs. Thus, the rates for the data streams detected with sphere detection may be selected based on the SNRs computed for the data streams with the MMSE-SIC scheme.

The signal qualities of the data streams detected with sphere detection may also be estimated in other manners. The estimated signal qualities for the data streams may be used to select the proper rates for the data streams.

In one or more embodiments, the system supports a set of rates or packet formats. Each supported rate may be associated with a specific spectral efficiency, a specific code rate, a specific modulation scheme, and a specific minimum SNR required to achieve the target PER for a non-fading, AWGN channel. The supported rates and the required SNRs may be stored in a look-up table. The rate for each data stream may be independently selected based on the SNR computed for that stream.

In other embodiments, the system supports a vector-quantized rate set, which may also be called a modulation coding scheme (MCS) set. The vector-quantized rate set contains only certain combinations of rates. The rates for the M data streams may be selected jointly from among the rate combinations in the rate set.

For both embodiments, different rates may be selected for different data streams base on their signal qualities and/or other factors. The ability to use different rates for the data streams may improve the overall throughput.

In one or more embodiments, the rates for the data streams detected with sphere detection may be selected in an iterative manner. Initial rates may be selected for the data streams based on their signal qualities. If the SER for an earlier detected stream is higher than the target SER, then another rate with a lower order modulation scheme may be selected for the stream, and the overall throughput may be determined for all streams. The combination of rates with the highest overall throughput for all data streams may be selected for use.

Figure 8:
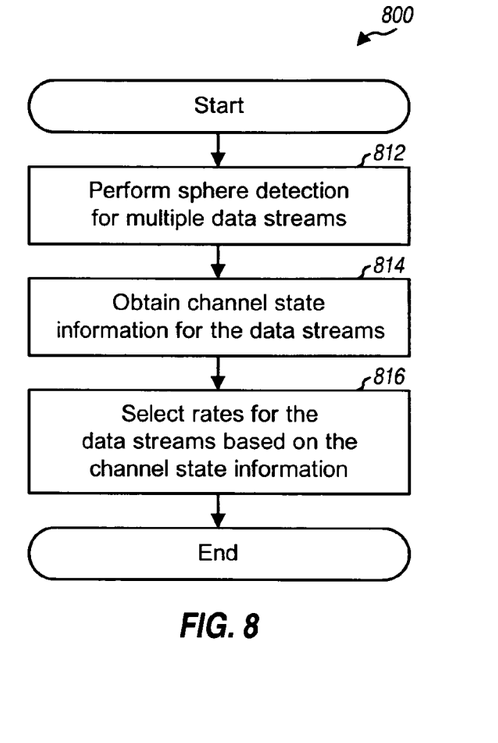
FIG. 8 shows aspects of a process for selecting rates for data streams.

FIG. 8 shows aspects of a process 800 for selecting rates for data streams. Sphere detection is performed for multiple data streams (block 812). Channel state information is obtained for the data streams detected with sphere detection (block 814). The channel state information may comprise channel estimates (e.g., a channel response matrix), noise estimates, interference estimates, power measurements, signal quality estimates, and/or other information.

Rates are selected for the data streams based on the channel state information (block 816). In one or more embodiments, the rates for the data streams are selected based on signal qualities (e.g., SNRs) of the data streams, which may be estimated based on the channel state information. The signal qualities for the data streams may be estimates based on an upper triangular matrix used for sphere detection. The upper triangular matrix may be derived from a channel response matrix, which may be part of the channel state information. The signal quality of each data stream may also be estimated based on the SIC scheme with an assumption that interference from data streams already detected is canceled. The rate for each data stream may be independently selected. The rates for all data streams may also be jointly selected. The rate for a data stream (e.g., the first data stream to be detected) may be selected to achieve a target SER or better for that data stream. An initial rate may be selected for the data stream based on its estimated signal quality, and a revised rate with a lower order modulation scheme may be selected if the initial rate results in the data stream exceeding a target SER.

Figure 9:
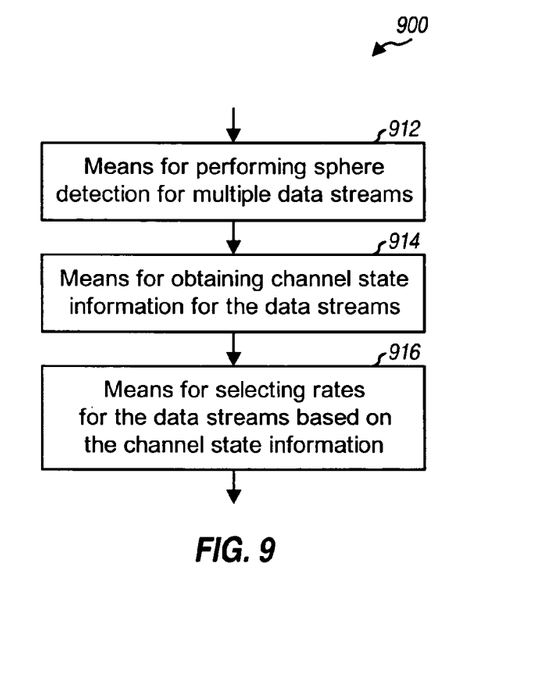
FIG. 9 shows aspects of an apparatus for selecting rates for data streams.

FIG. 9 shows aspects of an apparatus 900 for selecting rates for data streams. Apparatus 900 includes means for performing sphere detection for multiple data streams (block 912), means for obtaining channel state information for the data streams (block 914), and means for selecting rates for the data streams based on the channel state information (block 916). The rate for one or more data streams may be selected to achieve the target SER or better.

Figure 10:
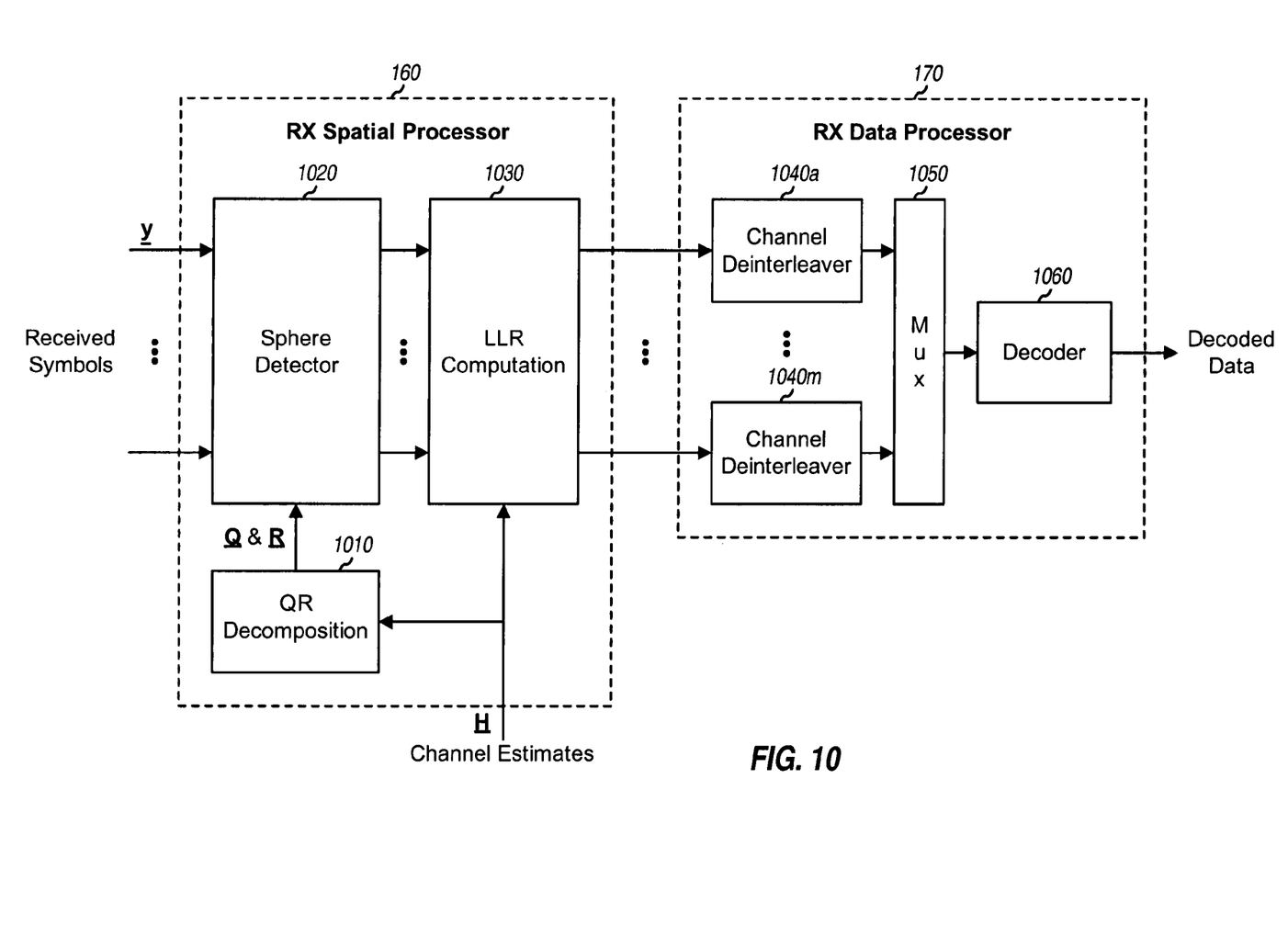
FIG. 10 shows a block diagram of aspects of a receive (RX) spatial processor and an RX data processor at the receiver.

FIG. 10 shows a block diagram of aspects of RX spatial processor 160 and RX data processor 170 at receiver 150. Within RX spatial processor 160, a computation unit 1010 receives the channel estimates H from channel processor 194 and derives the orthonormal matrix Q and the upper triangular matrix R. A sphere detector 1020 performs sphere detection on the received symbols y from R receiver units 154a through 154r with matrices Q and R and provides detected symbols or candidate hypotheses. Sphere detector 1020 may perform detection in an order determined by controller 190. Sphere detector 1020 may make hard decisions on detected symbols and may compute distances based on the hard decisions. Sphere detector 1020 may consider all hypotheses for each data symbol or, if spatial matched filtering is performed, may consider only a subset of hypotheses that are close to a detected symbol provided by the spatial matched filtering. An LLR computation unit 1030 computes the LLRs for the code bits based on the detected symbol or the candidate hypotheses from sphere detector 1020.

Within RX data processor 170, M channel deinterleavers 1040a through 1040m receive the LLRs for the M data streams from LLR computation unit 1030. Each channel deinterleaver 1040 deinterleaves the LLRs for its stream in a manner complementary to the interleaving performed by channel interleaver 226 for that stream. A multiplexer 1050 multiplexes or serializes the deinterleaved LLRs from channel deinterleavers 1040a through 1040m. A decoder 1060 decodes the deinterleaved LLRs and provides decoded data.

The techniques described herein may be implemented by various means. For example, these techniques may be implemented in hardware, firmware, software, or a combination thereof. For a hardware implementation, the processing units used to perform detection, rate selection, and so on may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 192 in FIG. 1) and executed by a processor (e.g., processor 190). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to select an order of detecting data symbols sent in a MIMO transmission based on at least one attribute of the data symbols, and to perform sphere detection for the data symbols in the selected order, wherein the at least one attribute is selected from a group of attributes, the group comprising modulation schemes, link margins, and a combination of modulation schemes and link margins, for the data symbols; and
a memory coupled to the at least one processor.

2. The apparatus of claim 1, wherein the at least one attribute comprises error probabilities for the data symbols, and wherein the at least one processor is configured to select the order based on error probabilities for the data symbols, starting with a data symbol having a lowest error probability.

3. The apparatus of claim 1, wherein the at least one attribute comprises modulation schemes for the data symbols, and wherein the at least one processor is configured to select the order based on modulation schemes for the data symbols, starting with a data symbol having a lowest order modulation scheme.

4. The apparatus of claim 1, wherein the at least one attribute comprises link margins for the data symbols, and wherein the at least one processor is configured to select the order based on link margins for the data symbols, starting with a data symbol having a largest link margin.

5. The apparatus of claim 1, wherein the at least one processor is configured to decompose a channel response matrix to obtain an upper triangular matrix for the selected order, to compute distances for a plurality of hypotheses for each data symbol based on the upper triangular matrix, and to determine candidate hypotheses for the data symbols based on the computed distances.

6. The apparatus of claim 1, wherein the at least one processor is configured to identify at least one hypothesized symbol for each data symbol, and to determine candidate hypotheses for the data symbols based on the at least one hypothesized symbol for each data symbol.

7. The apparatus of claim 1, wherein the at least one processor is configured to obtain at least one hard decision for at least one data symbol, and to determine candidate hypotheses for the data symbols with the at least one hard decision.

8. The apparatus of claim 1, wherein the data symbols comprise first and second data symbols, and wherein the at least one processor is configured to compute a first set of at least one distance for at least one hypothesis for the first data symbol, to obtain a first hard decision for the first data symbol based on the first set of at least one distance, and to compute a second set of at least one distance for at least one hypothesis for the second data symbol with the first hard decision.

9. The apparatus of claim 8, wherein the data symbols further comprise a third data symbol, and wherein the at least one processor is configured to obtain a second hard decision for the second data symbol based on the second set of at least one distance, and to compute a third set of at least one distance for at least one hypothesis for the third data symbol with the first and second hard decisions.

10. A method comprising:
selecting an order of detecting data symbols sent in a MIMO transmission based on at least one attribute of the data symbols, wherein the at least one attribute is selected from a group of attributes, the group comprising modulation schemes, link margins, and a combination of modulation schemes and link margins, for the data symbols; and
performing sphere detection for the data symbols in the selected order.

11. The method of claim 10, wherein the at least one attribute comprises error probabilities, modulation schemes, link margins, or a combination thereof for the data symbols.

12. The method of claim 10, wherein the performing sphere detection comprises
decomposing a channel response matrix to obtain an upper triangular matrix for the selected order,
computing distances for a plurality of hypotheses for each data symbol based on the upper triangular matrix, and
determining candidate hypotheses for the data symbols based on the computed distances.

13. The method of claim 10, wherein the performing sphere detection comprises
obtaining at least one hard decision for at least one data symbol, and
determining candidate hypotheses for the data symbols with the at least one hard decision.

14. The method of claim 10, further comprising:
identifying at least one hypothesized symbol for each data symbol; and
determining candidate hypotheses for the data symbols based on the at least one hypothesized symbol for each data symbol.

15. An apparatus comprising:
means for selecting an order of detecting data symbols sent in a MIMO transmission based on at least one attribute of the data symbols, wherein the at least one attribute is selected from a group of attributes, the group comprising modulation schemes, link margins, and a combination of modulation schemes and link margins, for the data symbols; and
means for performing sphere detection for the data symbols in the selected order.

16. The apparatus of claim 15, wherein the at least one attribute comprises error probabilities, modulation schemes, link margins, or a combination thereof for the data symbols.

17. The apparatus of claim 15, wherein the means for performing sphere detection comprises
means for decomposing a channel response matrix to obtain an upper triangular matrix for the selected order,
means for computing distances for a plurality of hypotheses for each data symbol based on the upper triangular matrix, and
means for determining candidate hypotheses for the data symbols based on the computed distances.

18. The apparatus of claim 15, wherein the means for performing sphere detection comprises
means for obtaining at least one hard decision for at least one data symbol, and
means for determining candidate hypotheses for the data symbols with the at least one hard decision.

19. A processor readable media for storing instructions operable to:
select an order of detecting data symbols sent in a MIMO transmission based on at least one attribute of the data symbols, wherein the at least one attribute is selected from a group of attributes, the group comprising modulation schemes, link margins, and a combination of modulation schemes and link margins, for the data symbols; and perform sphere detection for the data symbols in the selected order.

20. An apparatus comprising:
at least one processor configured to perform sphere detection on received symbols to detect for data symbols generated with at least two modulation schemes, wherein the at least one processor is configured to determine an order of detecting the data symbols based on the at least two modulation schemes, and to perform sphere detection for the data symbols in the determined order; and
a memory coupled to the at least one processor.

21. The apparatus of claim 20, wherein the at least one processor is configured to determine a particular number of hypotheses to evaluate for each data symbol based on a modulation scheme used for the data symbol.

22. The apparatus of claim 20, wherein the at least one processor is configured to identify a subset of all hypotheses for each data symbol based on a modulation scheme used for the data symbol, and to evaluate the subset of hypotheses for each data symbol.

23. The apparatus of claim 20, wherein the at least one processor is configured to retain a particular number of hypotheses for each data symbol based on a modulation scheme used for the data symbol.

24. The apparatus of claim 20, wherein the at least one processor is configured to retain a particular number of hypotheses for each data symbol based on link margin for the data symbol.

25. A method comprising:
obtaining received symbols for a MIMO transmission;
performing sphere detection on the received symbols to detect for data symbols generated with at least two modulation schemes; and
determining an order of detecting the data symbols based on the at least two modulation schemes, and to perform sphere detection for the data symbols in the determined order.

26. An apparatus comprising:
means for obtaining received symbols for a MIMO transmission;
means for performing sphere detection on the received symbols to detect for data symbols generated with at least two modulation schemes; and
means for determining an order of detecting the data symbols based on the at least two modulation schemes, and wherein the sphere detection for the data symbols is performed in the determined order.

27. The apparatus of claim 26, further comprising:
means for determining a particular number of hypotheses to evaluate for each data symbol based on a modulation scheme used for the data symbol.

28. A processor readable media for storing instructions operable to:
obtain received symbols for a MIMO transmission;
perform sphere detection on the received symbols to detect for data symbols generated with at least two modulation schemes; and
determine an order of detecting the data symbols based on the at least two modulation schemes, and wherein the sphere detection for the data symbols is performed in the determined order.

29. An apparatus comprising:
at least one processor configured to perform sphere detection for multiple data streams, to obtain channel state information for the multiple data streams, and to select rates for the multiple data streams based on the channel state information; and
a memory coupled to the at least one processor.

30. The apparatus of claim 29, wherein the channel state information comprises a channel response matrix, and wherein the at least one processor is configured to decompose the channel response matrix to obtain an upper triangular matrix used for sphere detection, to estimate signal qualities of the multiple data streams based on the upper triangular matrix, and to select the rates for the multiple data streams based on the signal qualities.

31. The apparatus of claim 30, wherein the at least one processor is configured to perform sphere detection for the multiple data streams in a sequential order, one data stream at a time, and to estimate signal quality of each data stream by assuming that interference from data streams already detected is canceled.

32. The apparatus of claim 29, wherein the at least one processor is configured to estimate signal qualities of the multiple data streams based on the channel state information and with successive interference cancellation.

33. The apparatus of claim 29, wherein the at least one processor is configured to perform sphere detection for the multiple data streams in a sequential order starting with a first data stream, and to select a rate for the first data stream to achieve a target symbol error rate or better for the first data stream.

34. The apparatus of claim 29, wherein the at least one processor is configured to perform sphere detection for the multiple data streams in a sequential order starting with a first data stream, to estimate signal quality of the first data stream based on the channel state information, to select an initial rate for the first data stream based on the signal quality of the first data stream, and to select a revised rate with a lower order modulation scheme for the first data stream if the initial rate results in the first data stream exceeding a target symbol error rate.

35. The apparatus of claim 29, wherein the at least one processor is configured to estimate signal quality of each of the multiple data streams based on the channel state information, and to independently select a rate for each data stream based on the signal quality of the data stream.

36. The apparatus of claim 29, wherein the at least one processor is configured to select the rates for the multiple data streams from a set of rate combinations.

37. The apparatus of claim 29, wherein the at least one processor is configured to cause indications of the rates for the multiple data streams to be sent to a transmitter.

38. A method comprising:
performing sphere detection for multiple data streams;
obtaining channel state information for the multiple data streams; and
selecting rates for the multiple data streams based on the channel state information.

39. The method of claim 38, wherein the performing sphere detection for the multiple data streams comprises performing sphere detection for the multiple data streams in a sequential order, one data stream at a time, and wherein the selecting the rates for the multiple data streams comprises estimating signal quality of each data stream based on the channel state information and assuming that interference from data streams already detected is canceled.

40. The method of claim 38, wherein the performing sphere detection for the multiple data streams comprises performing sphere detection for the multiple data streams in a sequential order starting with a first data stream, and wherein the selecting the rates for the multiple data streams comprises selecting a rate for the first data stream to achieve a target symbol error rate or better for the first data stream.

41. An apparatus comprising:
- means for performing sphere detection for multiple data streams,
- means for obtaining channel state information for the multiple data streams; and
- means for selecting rates for the multiple data streams based on the channel state information.

42. The apparatus of claim 41, wherein the means for performing sphere detection for the multiple data streams comprises means for performing sphere detection for the multiple data streams in a sequential order, one data stream at a time, and wherein the means for selecting the rates for the multiple data streams comprises means for estimating signal quality of each data stream based on the channel state information and assuming that interference from data streams already detected is canceled.

43. The apparatus of claim 41, wherein the means for performing sphere detection for the multiple data streams comprises means for performing sphere detection for the multiple data streams in a sequential order starting with a first data stream, and wherein the means for selecting the rates for the multiple data streams comprises means for selecting a rate for the first data stream to achieve a target symbol error rate or better for the first data stream.

44. A processor readable media for storing instructions operable to:
- perform sphere detection for multiple data streams;
- obtain channel state information for the multiple data streams; and
- select rates for the multiple data streams based on the channel state information.

* * * * *